US 9,618,786 B2

(12) United States Patent
Wachi et al.

(10) Patent No.: US 9,618,786 B2
(45) Date of Patent: Apr. 11, 2017

(54) COLOR FILTER SUBSTRATE, ELECTRO-OPTICAL DEVICE, AND PROJECTION-TYPE DISPLAY DEVICE

(71) Applicant: Seiko Epson Corporation, Tokyo (JP)

(72) Inventors: Reiko Wachi, Fujimi-machi (JP); Hidetoshi Ushiyama, Fujimi-machi (JP); Naotaka Kubota, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/906,249

(22) PCT Filed: Jul. 17, 2014

(86) PCT No.: PCT/JP2014/003789
§ 371 (c)(1),
(2) Date: Jan. 19, 2016

(87) PCT Pub. No.: WO2015/011901
PCT Pub. Date: Jan. 29, 2015

(65) Prior Publication Data
US 2016/0170260 A1 Jun. 16, 2016

(30) Foreign Application Priority Data

Jul. 24, 2013 (JP) ................... 2013-153325

(51) Int. Cl.
G02B 3/08 (2006.01)
G02F 1/1335 (2006.01)
(Continued)

(52) U.S. Cl.
CPC ....... G02F 1/133514 (2013.01); G02B 5/201 (2013.01); G02F 1/133516 (2013.01);
(Continued)

(58) Field of Classification Search
CPC ......... G02F 1/133514; G02F 1/133516; G02F 1/133526; G02F 2001/133368; G02B 5/201
USPC .................................. 359/741, 722
See application file for complete search history.

(56) References Cited

U.S. PATENT DOCUMENTS 6,950,156 B1 9/2005 Yoshida
8,189,142 B2 5/2012 Taniguchi et al.
(Continued)

FOREIGN PATENT DOCUMENTS

JP 58-220106 A 12/1983
JP 04-355406 A 12/1992
(Continued)

OTHER PUBLICATIONS

Search Report received in International Application No. PCT/JP2014/003789; Sep. 30, 2014.

Primary Examiner — Alicia M Harrington
(74) Attorney, Agent, or Firm — ALG Intellectual Property, LLC

(57) ABSTRACT

In an electro-optical device 100, a color filter substrate 20 is provided with colored pixels, which are: a red pixel 2(R) with a colored layer 28(R) formed inside a concave portion 25(R) formed in a first surface 20s of a light-transmissive substrate 20d, a green pixel 2(G) with a colored layer 28(G) formed inside a concave portion 25(G) formed in said surface, and a blue pixel 2(B) with a colored layer 28(B) formed inside a concave portion 25(B) formed in said surface. In addition, in the substrate 20d, a non-colored pixel 2(W), at which no colored layer is provided, is provided outside the concave portion 25(R), 25(G), 25(B) at a position where the thickness of the substrate 20d is greater than that at the colored pixels.

15 Claims, 12 Drawing Sheets

(51) Int. Cl.
 *G02B 5/20* (2006.01)
 *G02F 1/1333* (2006.01)
(52) U.S. Cl.
 CPC ............. *G02F 1/133526* (2013.01); *G02F 2001/133368* (2013.01)

(56) References Cited

U.S. PATENT DOCUMENTS

| | | | |
|---|---|---|---|
| 2007/0008463 A1* | 1/2007 | Tanaka | G02F 1/133514 349/107 |
| 2007/0153160 A1 | 7/2007 | Lee et al. | |
| 2013/0335709 A1 | 12/2013 | Akiyama | |

FOREIGN PATENT DOCUMENTS

| | | |
|---|---|---|
| JP | 04-355722 A | 12/1992 |
| JP | 05-257008 A | 10/1993 |
| JP | 08-201800 A | 8/1996 |
| JP | 10-160925 A | 6/1998 |
| JP | 2000-330102 A | 11/2000 |
| JP | 2005-099614 A | 4/2005 |
| JP | 2006-259135 A | 9/2006 |
| JP | 2009-053417 A | 3/2009 |
| JP | 2009-080313 A | 4/2009 |
| JP | 2010-060619 A | 3/2010 |
| JP | 2011-170177 A | 9/2011 |
| JP | 2012-119838 A | 6/2012 |
| JP | 2012-189861 A | 10/2012 |
| JP | 2014-154662 A | 8/2014 |
| KR | 2007-0071293 A | 7/2007 |
| KR | 2008-0066282 A | 7/2008 |

* cited by examiner

FIG. 1
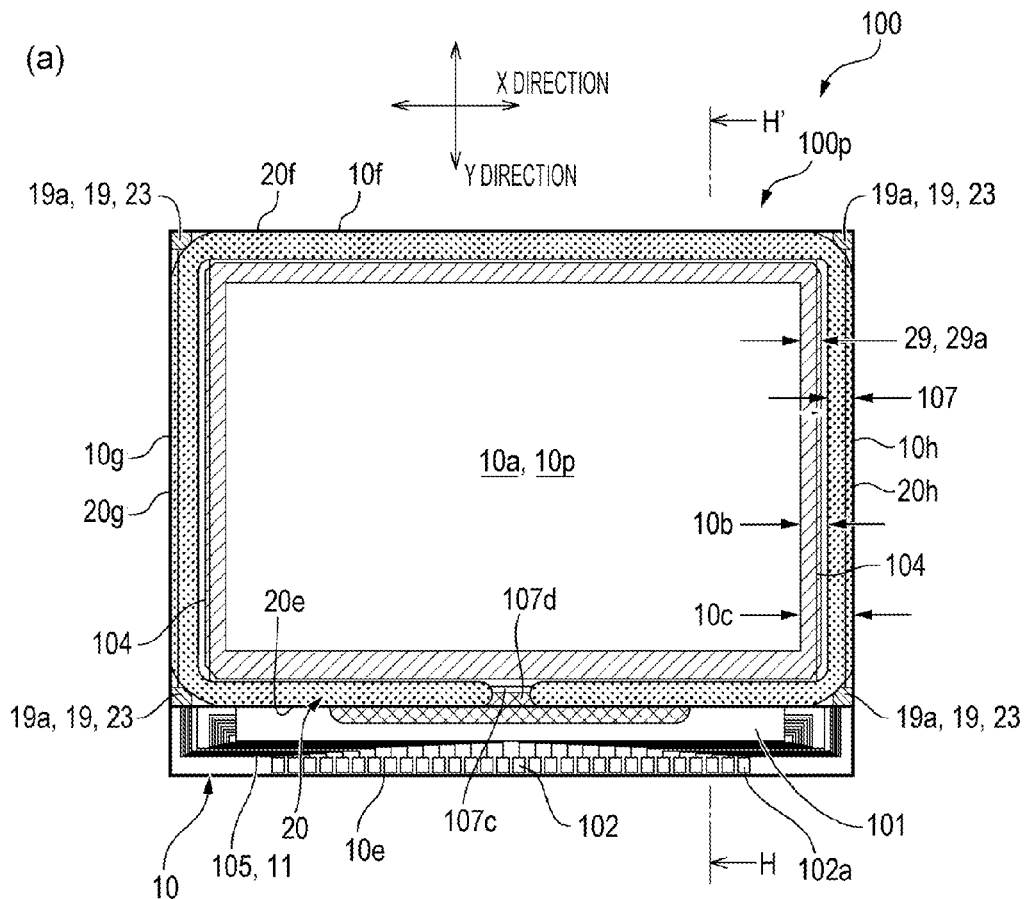
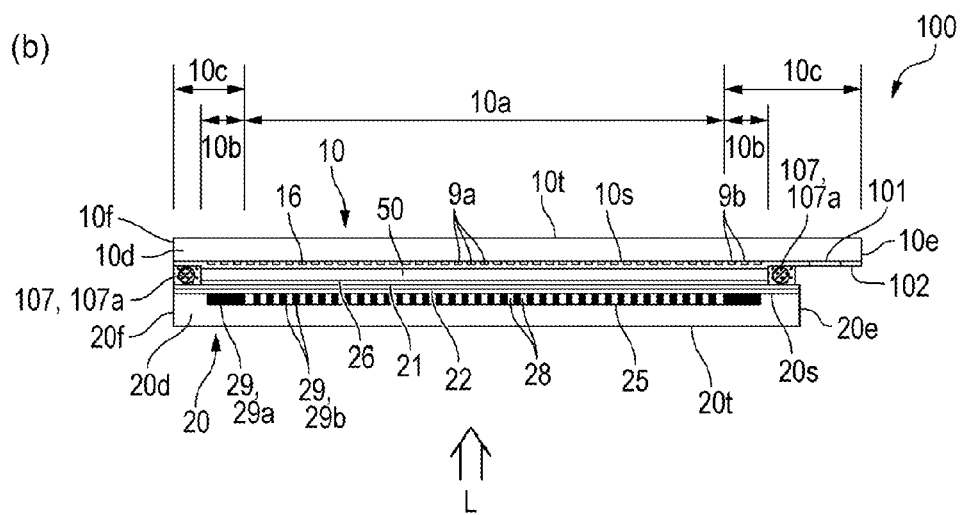

FIG. 10
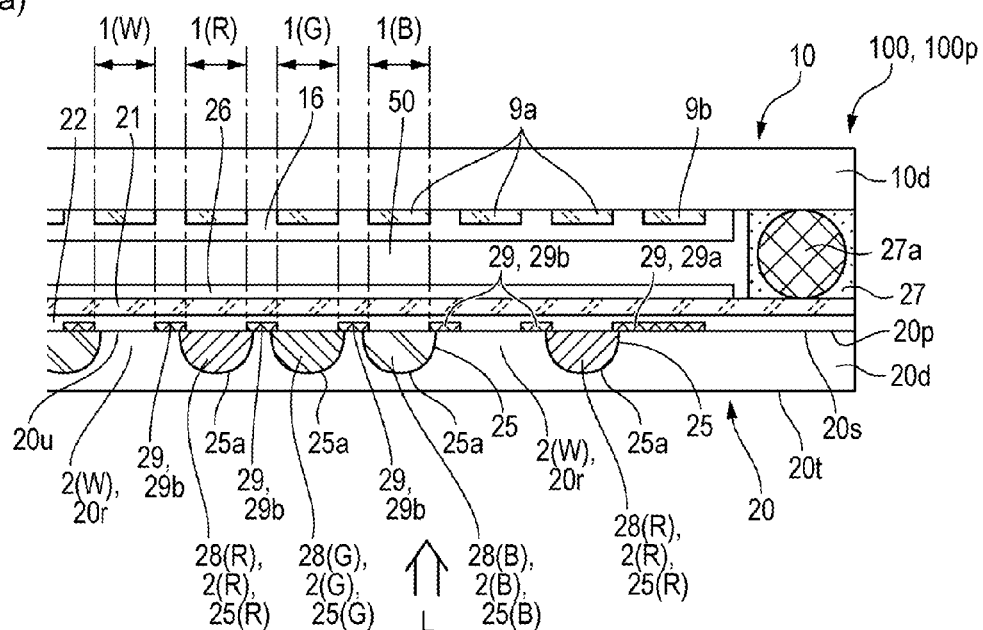
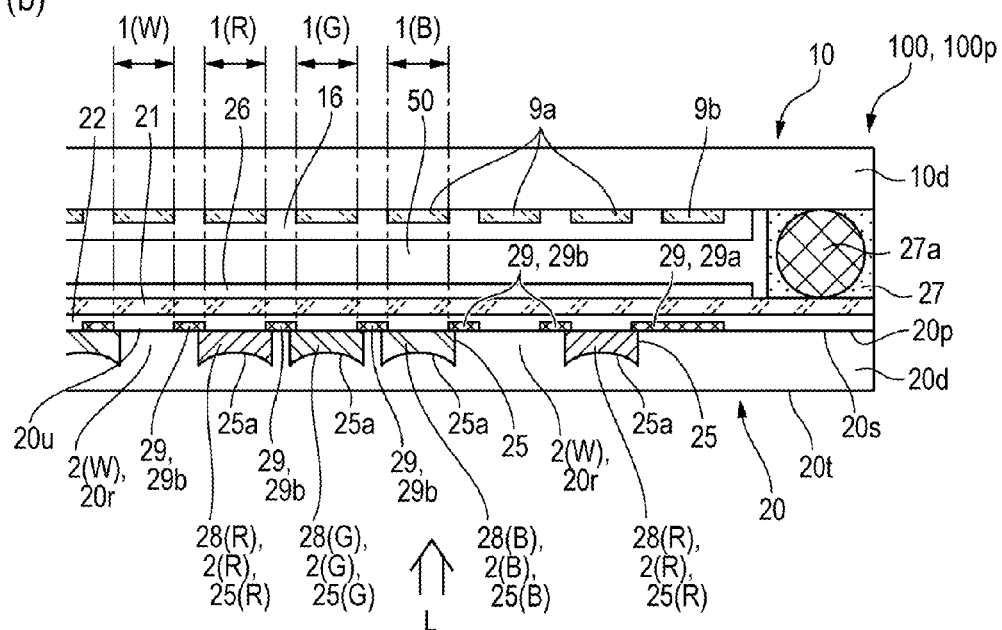

COLOR FILTER SUBSTRATE, ELECTRO-OPTICAL DEVICE, AND PROJECTION-TYPE DISPLAY DEVICE

TECHNICAL FIELD

The present invention relates to a color filter substrate in which a colored layer is formed in a substrate, an electro-optical device provided with a color filter, and a projection-type display device provided with the electro-optical device.

BACKGROUND ART

For color image display on an electro-optical device such as a liquid crystal device, a color filter substrate in which a colored layer of red (R), green (G), and blue (B) is formed on a substrate is sometimes used. In a color filter substrate, for example, one pixel is made up of three subpixels, which are a red pixel with a colored layer of red (R), a green pixel with a colored layer of green (G), and a blue pixel with a colored layer of blue (R).

In such a color filter substrate, it has been proposed (refer to PTLs 1 and 2) that, for example, for the purpose of achieving greater stability in a cell gap (the thickness of a liquid crystal layer) and making the cell gap narrower when the color filter substrate is used as an opposite substrate, which is provided opposite an element substrate in a liquid crystal device, recesses are formed in the substrate, and a colored layer is formed inside the recesses.

In another proposed art regarding a color filter substrate, for the purpose of increasing the amount of light for white display, etc., a white pixel (non-colored pixel) is provided in addition to a red pixel (colored pixel), a green pixel (colored pixel), and a blue pixel (colored pixel) in one pixel (refer to PTLs 3 and 4).

CITATION LIST

Patent Literature

PTL 1: Japanese Unexamined Patent Application Publication No. 2005-99614
PTL 2: Japanese Unexamined Patent Application Publication No. 2012-189861
PTL 3: Japanese Unexamined Patent Application Publication No. 2006-259135
PTL 4: Japanese Unexamined Patent Application Publication No. 2011-170177

SUMMARY OF INVENTION

Technical Problem

When a color filter substrate is manufactured, a colored layer forming process and a colored layer patterning process are performed repetitively for a substrate, thereby forming a colored layer made of resin of red (R), green (G), and blue (B) sequentially. Therefore, if a white pixel is added in the method of manufacturing a color filter substrate proposed in PTLs 1 and 2, etc., an additional process of forming a colorless resin layer or forming a white-pigment-containing resin layer and an additional process of patterning the resin layer are necessary, resulting in a problem of an increase in color filter substrate manufacturing cost.

In view of the problem described above, an object of the present invention is to provide a color filter substrate that makes it possible to form colored pixels and a non-colored pixel efficiently, an electro-optical device provided with a color filter, a projection-type display device provided with the electro-optical device, and a method of manufacturing the color filter substrate.

Solution to Problem

To solve the problem described above, a color filter substrate comprises: a first colored pixel at which a first colored layer is provided inside a concave portion formed in one surface of a substrate; a second colored pixel at which a second colored layer is provided inside the concave portion, color of the second colored layer being different from color of the first colored layer; and a non-colored pixel at which no colored layer is provided, the non-colored pixel being located at a position where thickness of the substrate is greater than that at the first colored pixel and the second colored pixel.

A method of manufacturing a color filter substrate according to the present invention comprises: an etching mask forming step of forming an etching mask on one surface of a substrate, with a part of the one surface exposed; an etching step of forming a concave portion by etching the part exposed through the etching mask in the one surface; and a colored layer forming step of forming a first colored layer inside the concave portion to form a first colored pixel and forming a second colored layer inside the concave portion to form a second colored pixel, the second colored layer being formed at a position different from a position of the first colored layer, color of the second colored layer being different from color of the first colored layer, wherein a non-colored pixel, which does not have any colored layer, is formed at a position where the substrate was covered by the etching mask.

In the present invention, "substrate" encompasses a case where a substrate in its entirety is made of a glass substrate or a quartz substrate, etc., and a case where a light-transmissive insulation film is formed on one surface of a glass substrate or a quartz substrate, etc.

In the color filter substrate according to the present invention, since the non-colored pixel is provided in addition to the first colored pixel and the second colored pixel, advantageously, it is possible to increase the amount of light for white display. Moreover, since the first colored layer of the first colored pixel and the second colored layer of the second colored pixel are formed inside the concave portion of the substrate, there is no significant protrusion of the first colored layer and the second colored layer from the one surface of the substrate. Regarding the structure of the non-colored pixel, no layer made of colorless resin or white-pigment-containing resin is formed, and a thick non-removed portion of the substrate is utilized. Therefore, the process of forming a colorless resin layer or forming a white-pigment-containing resin layer at the non-colored pixel is not necessary. Therefore, it is possible to form the colored pixels and the non-colored pixel efficiently. Furthermore, since the substrate remains thick at the non-colored pixel instead of forming a layer made of colorless resin or white-pigment-containing resin thereat, the non-colored pixel is not significantly recessed at the one surface of the substrate in comparison with the first colored layer and the second colored layer. Therefore, advantageously, it is possible to stabilize a cell gap (the thickness of a liquid crystal layer) when the color filter substrate is used as an opposite substrate provided opposite an element substrate in a liquid crystal device.

In the present invention, preferably, the concave portion should include a first concave portion inside which the first colored layer is provided and a second concave portion inside which the second colored layer is provided. With such a structure, it is possible to provide the first colored layer inside an area compartmentalized by the first concave portion and the second colored layer inside an area compartmentalized by the second concave portion.

In the present invention, preferably, each of the first colored pixel, the second colored pixel, and the non-colored pixel should be enclosed by a light shielding layer when viewed in a direction of a normal line to the substrate. With such a structure, it is possible to form a black matrix or black stripes for preventing color mixture between pixels located adjacent to each other by means of the light shielding layer.

In the present invention, preferably, each of the first colored pixel, the second colored pixel, and the non-colored pixel should be enclosed by a light shielding layer when viewed in a direction of a normal line to the substrate; and the concave portion should include, by the light shielding layer, a first concave portion inside which the first colored layer is provided and a second concave portion inside which the second colored layer is provided. With such a structure, it is possible to form a black matrix or black stripes for preventing color mixture between pixels located adjacent to each other by means of the light shielding layer. Moreover, since the first concave portion and the second concave portion can be formed by the light shielding layer, it is possible to provide the first colored layer inside an area compartmentalized by the first concave portion and the second colored layer inside an area compartmentalized by the second concave portion.

In the present invention, preferably, the thickness of the substrate at the non-colored pixel should be equal to the thickness of the substrate at an edge portion of the substrate; and a surface located at the non-colored pixel at the one surface of the substrate should be on the same plane as a surface located at the edge portion at the one surface of the substrate That is, when the concave portion (the first concave portion and the second concave portion) is formed by etching, preferably, the portion corresponding to the non-colored pixel should be used as an area where no etching is performed, as is the case with the edge portion of the substrate.

In the present invention, preferably, the index of refraction of the first colored layer and the second color layer should be different from the index of refraction of the substrate; and the bottom of the first concave portion and the second concave portion should be curved in a convex or concave shape so as to constitute a micro lens surface. With such a structure, it is possible to refract incident light entering the colored layer into a predetermined direction.

In the present invention, a structure in which the sides of the first concave portion and the second concave portion are reflective surfaces inclined in such a way that opening area size increases toward the one surface may be adopted. With such a structure, it is possible to reflect light impinging on the sides of the first concave portion and the second concave portion into a predetermined direction.

In the present invention, a structure in which the thickness of the substrate at the first colored pixel is equal to the thickness of the substrate at the second colored pixel may be adopted.

In the present invention, a structure in which the thickness of the substrate at the first colored pixel is different from the thickness of the substrate at the second colored pixel may be adopted.

In the present invention, a structure in which the thickness of the first colored layer is equal to the thickness of the second colored layer may be adopted.

In the present invention, a structure in which the thickness of the first colored layer is different from the thickness of the second colored layer may be adopted.

In the present invention, a structure in which a surface of the first colored layer that is the opposite of a surface on the substrate and a surface of the second colored layer that is the opposite of a surface on the substrate are located at the same height position from the substrate may be adopted. With such a structure, advantageously, it is possible to stabilize a cell gap (the thickness of a liquid crystal layer) when the color filter substrate is used as an opposite substrate provided opposite an element substrate in a liquid crystal device.

In the present invention, a structure in which a surface of the first colored layer that is the opposite of a surface on the substrate and a surface of the second colored layer that is the opposite of a surface on the substrate are located at different height positions from the substrate may be adopted. With such a structure, it is possible to make a cell gap (the thickness of a liquid crystal layer) at the first colored pixel and a cell gap at the second colored pixel different from each other when the color filter substrate is used as an opposite substrate provided opposite an element substrate in a liquid crystal device.

An electro-optical device equipped with the color filter substrate to which the present invention is applied outputs image light, said image light obtained either by modulating light of each of pixels, said light of each of pixels having passed through the first colored pixel, the second colored pixel, and the non-colored pixel, or by allowing light of each of the pixels, said light of each of the pixels having been modulated, to pass through the first colored pixel, the second colored pixel, and the non-colored pixel.

Electronic equipment equipped with the electro-optical device to which the present invention is applied includes: a projection optical system that projects the image light.

BRIEF DESCRIPTION OF DRAWINGS

FIG. 1 is a diagram for explaining the liquid crystal panel of an electro-optical device according to a first embodiment of the present invention.

FIG. 10 is a sectional view that illustrates a color filter substrate, etc. according to a fourth embodiment of the present invention.

DESCRIPTION OF EMBODIMENTS

Figure 2:
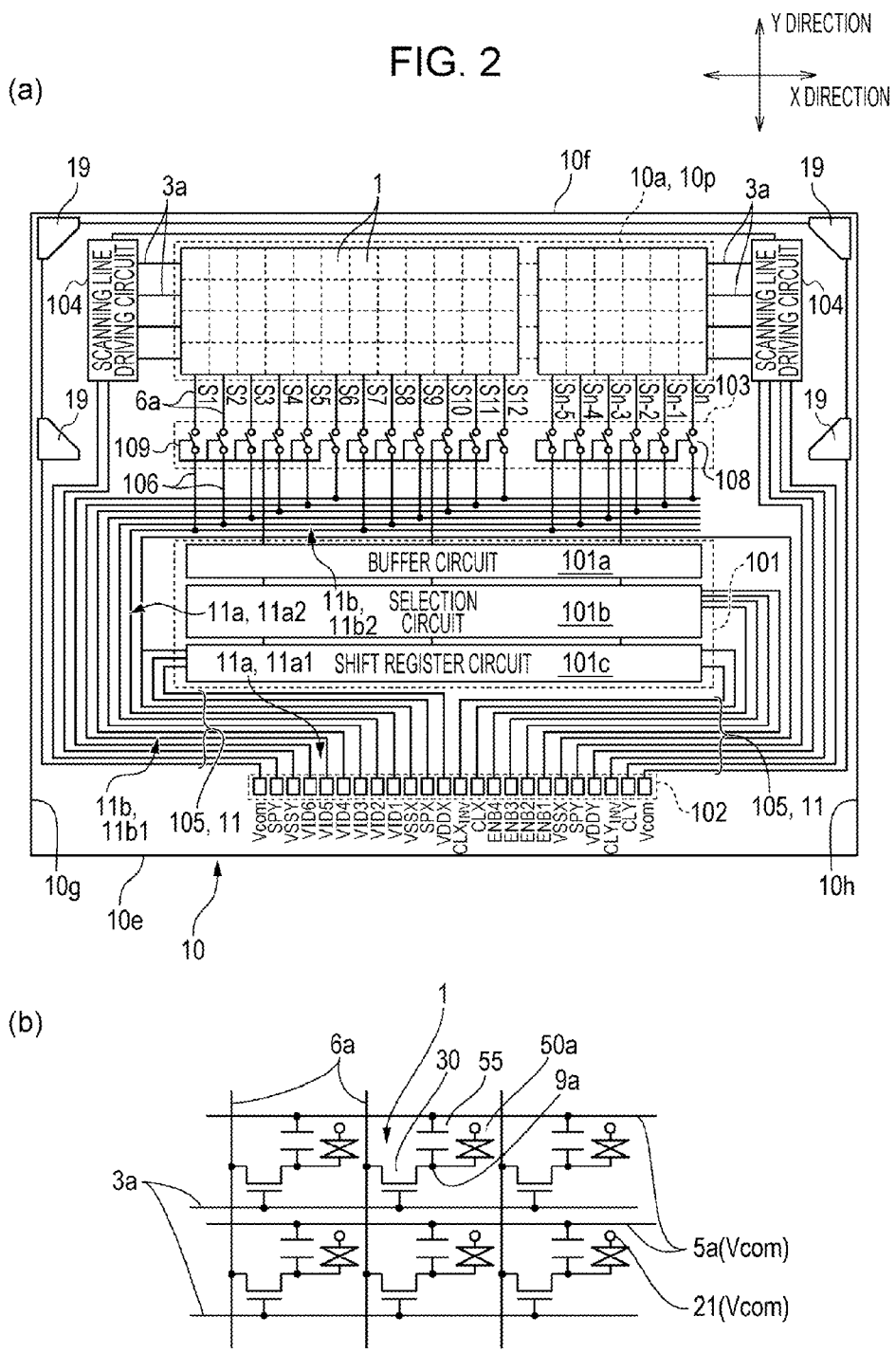
FIG. 2 is a diagram for explaining the electric structure of an element substrate of the electro-optical device according to the first embodiment of the present invention.

As a color filter substrate to which the present invention is applied, a color filter substrate used in a liquid crystal device, which is a typical example of an electro-optical device, is described below. In the drawings referred to in the description below, different scales are used for layers and members illustrated therein so that the layer/member each has a size that is easily recognizable. In the drawings referred to in the description below, a smaller number of lines such as scanning lines, data lines, and signal lines than actual number are illustrated. Two directions orthogonal to each other along the plane of an element substrate and the plane of a color filter substrate are defined as X and Y directions in the description below.

First Embodiment

FIG. 1 is a diagram for explaining the liquid crystal panel of an electro-optical device according to a first embodiment of the present invention, wherein FIG. 1(a) is a plan view of the liquid crystal panel seen together with constituent elements from the opposite-substrate side, and FIG. 1(b) is an H-H' sectional view thereof.

An electro-optical device 100 illustrated in FIG. 1(a), (b) is a liquid crystal device, and includes a liquid crystal panel 100p. In the liquid crystal panel 100p, an element substrate 10 and, as an opposite substrate, a color filter substrate 20 are bonded to each other by means of a sealing material 107, with a predetermined clearance left therebetween. The sealing material 107 is provided in the shape of a frame along the edges of the color filter substrate 20. The sealing material 107 is an adhesive made of a photo-curable resin, a thermosetting resin, or the like, and contains a gap material 107a such as glass fibers or glass beads for leaving a predetermined value of a distance between the two substrates. In the liquid crystal panel 100p, a liquid crystal layer 50 (electro-optical substance layer) is provided between the element substrate 10 and the color filter substrate 20 inside an area surrounded by the sealing material 107. In this embodiment, the sealing material 107 has a discontinuous portion that is used as a liquid crystal filling opening 107c. The liquid crystal filling opening 107c is sealed by means of a sealant 107d after a liquid crystal material is filled in therethrough.

Both the element substrate 10 and the color filter substrate 20 are rectangular. The element substrate 10 has Y-directional opposite two sides 10e and 10f and X-directional opposite two sides 10g and 10h. The color filter substrate 20 has Y-directional opposite two sides 20e and 20f and X-directional opposite two sides 20g and 20h. An image display area 10a is formed as a rectangular area approximately at the center of the liquid crystal panel 100p. The outside of the image display area 10a is a frame-shaped peripheral area 10c.

In the peripheral area 10c of the element substrate 10, a data line driving circuit 101 and plural terminals 102 are formed along one of the Y-directional opposite two sides, 10e, of the element substrate 10. A scanning line driving circuit 104 is formed along each of the sides 10g and 10h extending adjacently from the side 10e. A flexible wiring board (not illustrated) is connected to the terminals 102. Various voltages and various signals are supplied from an external control circuit to the element substrate 10 via the flexible wiring board.

The body of the element substrate 10 is made of a light-transmissive substrate 10d such as a quartz substrate or a glass substrate. The substrate 10d has a first surface 10s and a second surface 10t. Pixel electrodes 9a and pixel transistors 30, etc., which will be described later with reference to FIG. 2, are arranged in a matrix layout in the image display area 10a on the first surface 10s, which faces toward the color filter substrate 20. Therefore, the image display area 10a is formed as a pixel electrode arrangement area 10p, in which the pixel electrodes 9a are arranged in a matrix layout. In the element substrate 10 having the structure described above, an alignment film 16 is formed on the pixel electrodes 9a.

In the peripheral area 10c of the element substrate 10, dummy pixel electrodes 9b, which are formed together with the pixel electrodes 9a at the same time, exist in a frame-shaped peripheral area 10b between the image display area 10a and the sealing material 107. For example, dummy pixel electrodes 9b located adjacent to each other are connected to each other via a small-width connection portion (not illustrated), and a common voltage Vcom is applied thereto.

The body of the color filter substrate 20 is made of a light-transmissive substrate 20d such as a quartz substrate or a glass substrate. The substrate 20d has a first surface 20s and a second surface 20t. A common electrode 21 is formed on the first surface 20s, which faces toward the element substrate 10. The common electrode 21 is either formed substantially throughout the entire surface of the color filter substrate 20 or formed across plural pixels as plural strip electrodes. In this embodiment, the common electrode 21 is formed substantially throughout the entire surface of the color filter substrate 20. Over the first surface 20s of the substrate 20d, an alignment film 26 is formed on the top of the common electrode 21 (at the upper-layer side where the element substrate 10 is located), and a light-transmissive overcoat film 22 is formed under the common electrode 21 (at the lower-layer side where the substrate 20d is located).

In the first surface 20s of the substrate 20d, a light shielding layer 29 and a colored layer 28, which will be described later, are formed under the overcoat film 22 (at the lower-layer side where the substrate 20d is located). In this embodiment, the light shielding layer 29 is formed as a frame portion 29a extending outside and along the edges of the image display area 10a. The inner edges of the light shielding layer 29 demarcate the image display area 10a. The frame portion 29a is formed at a position where it overlaps the dummy pixel electrodes 9b. There is a clearance between the outer edges of the frame portion 29a and the inner edges of the sealing material 107. Therefore, the frame portion 29a and the sealing material 107 do not overlap each other. The light shielding layer 29 is formed also as a light shielding portion (black matrix portion) 29b, which overlaps a pixel gap area between the pixel electrodes 9a. In this embodiment, the light shielding layer 29 is a metal layer made of aluminum or the like.

Substrate-to-substrate conductive electrodes 23 are formed at four corners on the first surface 20s of the color filter substrate 20. Substrate-to-substrate conductive electrodes 19 are formed on the first surface 10s of the element substrate 10 at positions corresponding to the positions of the substrate-to-substrate conductive electrodes 23 of the color filter substrate 20. In this embodiment, the substrate-to-substrate conductive electrodes 23 constitute a part of the common electrode 21. A substrate-to-substrate conductive material 19a, which contains conductive particles, is provided between the substrate-to-substrate conductive electrodes 19 and the substrate-to-substrate conductive electrodes 23. A common voltage Vcom is applied from the side of the element substrate 10 to the common electrode 21 of the color filter substrate 20 through the substrate-to-substrate conductive electrodes 19, the substrate-to-substrate conductive material 19a, and the substrate-to-substrate conductive electrodes 23. The sealing material 107 is provided with substantially the same width along the edges of the color filter substrate 20. However, at the areas overlapping the corners of the color filter substrate 20, the sealing material 107 is provided in such a way as to take an inside shortcut bypassing the substrate-to-substrate conductive electrodes 19 and 25.

In the electro-optical device 100 having the structure described above, a light polarization film, a phase difference film, a light polarization plate, and the like are provided in predetermined orientation with respect to the liquid crystal panel 100p depending on the type of the liquid crystal layer 50 used, and depending on the mode of normally white or normally black. In this embodiment, the electro-optical device 100 is a transmissive-type liquid crystal device, and the pixel electrodes 9a and the common electrode 21 are each made of a light-transmissive conductive film such as an ITO (Indium Tin Oxide) film or an IZO (Indium Zinc Oxide) film. In such a transmissive-type liquid crystal device (electro-optical device 100), for example, light that comes in from the side of the color filter substrate 20 is modulated during the process before the light goes out from the side of the element substrate 10, and image display is performed. In this case, for each of the pixels 1, the liquid crystal layer 50 modulates light having passed through colored pixels and a non-colored pixel of the color filter substrate 20 described later, and image display is performed by means of image light obtained as a result of the modulation. Light that comes in from the side of the element substrate 10 may be modulated, for image display, during the process before the light goes out from the side of the color filter substrate 20. In this case, light modulated for each of the pixels 1 by the liquid crystal layer 50 passes through colored pixels and a non-colored pixel of the color filter substrate 20 described later, and image display is performed by means of image light obtained as a result of the transmission. In this embodiment, as indicated by an arrow L, a case where light that comes in from the side of the color filter substrate 20 is modulated for image display when the light goes out from the side of the element substrate 10 is mainly explained.

If the electro-optical device 100 is a reflective-type liquid crystal device, the common electrode 21 is made of a light-transmissive conductive film such as an ITO film or an IZO film, whereas the pixel electrodes 9a are made of a reflective conductive film such as an aluminum film. In such a reflective-type liquid crystal device (electro-optical device 100), light that comes in from the side of the color filter substrate 20 is reflected by the element substrate 10 to go out, with modulation performed during this process, and image display is performed.

The electro-optical device 100 can be used as a color display device for electronic equipment such as a mobile computer, a mobile phone, or the like. The electro-optical device 100 can be used as electronic paper. The electro-optical device 100 can be used as an image generation device in a projection-type display device (liquid crystal projector) described later.

(Electric Structure of Element Substrate 10)

FIG. 2 is a diagram for explaining the electric structure of the element substrate 10 of the electro-optical device 100 according to the first embodiment of the present invention, wherein FIG. 2(a) is a diagram for explaining the plan-view layout of circuits and lines of the element substrate 10, and FIG. 2(b) is a diagram for explaining the electric structure of pixels. In the description below, the same alphabet suffix is added to the name of a signal inputted into the element substrate 10 via the terminal 102 and to the name of a line L for the signal. For example, regarding a "clock signal CLX", which is a signal name, the corresponding signal line is denoted as "clock signal line LCLX". In the description below, the same alphabet suffix is added to the name of a signal inputted into the element substrate 10 via the terminal 102 and to the name of a terminal T for the signal. For example, regarding a "clock signal CLX", which is a signal name, the corresponding terminal 102 is denoted as "terminal TCLX".

As illustrated in FIG. 2(a), (b), in the electro-optical device 100, the pixel electrode arrangement area 10p, in which plural pixels 1 are arranged in a matrix layout, is formed at the center area of the element substrate 10. Inside the pixel electrode arrangement area 10p, the area enclosed by the inner edges of the frame portion 29a illustrated in FIG. 1(b) is the image display area 10a. On the element substrate 10, plural scanning lines 3a extending in the X direction and plural data lines 6a extending in the Y direction are formed inside the pixel electrode arrangement area 10p. The pixels 1 are formed at positions corresponding respectively to the intersections of these lines. The pixel transistor 30 (pixel switching element), which is made of a TFT or the like, and the pixel electrode 9a are formed in each of the pixels 1. The data line 6a is electrically connected to the source of the pixel transistor 30. The scanning line 3a is electrically connected to the gate of the pixel transistor 30. The pixel electrode 9a is electrically connected to the drain of the pixel transistor 30.

The scanning line driving circuit 104, the data line driving circuit 101, a sampling circuit 103, the substrate-to-substrate conductive electrodes 19, the terminals 102, and the like are formed on the element substrate 10 in the peripheral area 10c, which is located outside the pixel electrode arrangement area 10p. Plural lines 105 extend from the terminals 102 toward the scanning line driving circuit 104, the data line driving circuit 101, the sampling circuit 103, and the substrate-to-substrate conductive electrodes 19. The sampling circuit 103 is electrically connected to the plural data lines 6a. The scanning line driving circuit 104 is electrically connected to the plural scanning lines 3a.

In each of the pixels 1, the pixel electrode 9a is provided opposite the common electrode 21 of the color filter substrate 20 explained earlier with reference to FIG. 1, with the liquid crystal layer 50 sandwiched therebetween; they constitute a liquid crystal capacitor 50a. For the purpose of preventing an image signal retained at the liquid crystal capacitor 50a from fluctuating, a retention capacitor 55 is added in parallel with the liquid crystal capacitor 50a in each of the pixels 1. In this embodiment, for the retention capacitance 55, a capacitance line 5a, which extends in parallel with the scanning line 3a across plural pixels 1, is formed, and a voltage Vcom is applied to capacitance line 5a. The same voltage as the common voltage, which is applied to the common electrode 21, can be used as the voltage Vcom.

The plural terminals 102, which are provided along the side 10e of the element substrate 10, are roughly classified into four groups of application, which are: a terminal group for the common voltage line, a terminal group for the scanning line driving circuit, a terminal group for image signals, and a terminal group for the data line driving circuit. Specifically, the terminals 102 include terminals TVcom for common voltage lines LVcom, and include terminals TSPY, TVSSY, TVDDY, TCLY, and TCLYINV for the scanning line driving circuit 104. In addition, the terminals 102 include terminals TVID1 to TVID6 for image signals VID1 to VID6, and include terminals TVSSX, TSPX, TVDDX, TCLX, TCLXINV, TENB1 to TENB4, and TVSSX for the data line driving circuit 101.

The data line driving circuit 101 includes a shift register circuit 101c, a selection circuit 101b, and a buffer circuit 101a. In the data line driving circuit 101, the shift register circuit 101c uses, as its source of power, negative power VSSX and positive power VDDX supplied from an external control circuit via the terminals 102 (terminals TVSSX and TVDDX) and the lines 105 (lines LVSSX and LVDDX), and starts transfer operation on the basis of a start signal SPX, which is supplied from the external control circuit via the terminal 102 (terminal TSPX) and the line 105 (line LSPX). On the basis of a clock signal CLX and an inverse phase clock signal CLXINV, which are supplied via the terminals 102 (terminals TCLX and TCLXINV) and the line 105 (lines LCLX and LCLXINV), the shift register circuit 101c outputs a transfer signal to the selection circuit 101b. The alias name of the selection circuit 101b is "enable circuit". The selection circuit 101b specifies each sampling time in the sampling circuit 103 described later by limiting the pulse width of the transfer signal outputted from the shift register circuit 101c to the pulse width of enable signals ENB1 to ENB4 supplied from an external control circuit via the terminals 102 (terminals TENB1 to TENB4) and the lines 105 (lines LENB1 to LENB4). More specifically, the selection circuit 101b is made up of a NAND circuit, and an inverter, etc. provided for each stage of the shift register circuit 101c, and performs voltage selection control on a time axis in such a way as to drive the data lines 6a, only if the level of the transfer signal outputted from the shift register circuit 101c is high and if the level of any of the enable signals ENB1 to ENB4 is high. After the buffering of the voltage-selected transfer signal, the buffer circuit 101a supplies it as a sampling circuit driving signal to the sampling circuit 103 via a sampling circuit driving signal line 109.

The sampling circuit 103 includes plural switching elements 108 for sampling image signals. In this embodiment, the switching element 108 is a field-effect-type transistor such as TFT. The data line 6a is electrically connected to the drain of the switching element 108. The line 105 (image signal line LVID1 to LVID6) is connected via the line 106 to the source of the switching element 108. The sampling circuit driving signal line 109, which is connected to the data line driving circuit 101, is connected to the gate of the switching element 108. The image signals VID1 to VID6 supplied to the lines 105 (image signal lines LVID1 to LVID6) via the terminals 102 (terminals TVID1 to TVID6) are sampled by the sampling circuit 103 in accordance with the supply of the sampling circuit driving signals from the data line driving circuit 101 via the sampling circuit driving signal line 109, and are supplied as image signals S1, S2, S3, . . . , Sn to the data lines 6a, respectively. In this embodiment, the image signals S1, S2, S3, . . . , Sn are supplied for groups of six data lines 6a corresponding to the six-phase serial-to-parallel phase-expanded image signals VID1 to VID6. Regarding the image signal phase expansion, the number of phases is not limited to six. Image signals having been subjected to phase expansion to plural phases, for example, nine phases, twelve phases, twenty-four phases, forty-eight phases, or the like, are supplied for groups of data lines 6a whose number corresponds to the number of phases.

The scanning line driving circuit 104 includes a shift register circuit and a buffer circuit. The scanning line driving circuit 104 uses, as its source of power, negative power VSSY and positive power VDDY supplied from an external control circuit via the terminals 102 (terminals TVSSY and TVDDY) and the lines 105 (lines LVSSY and LVDDY), and starts the transfer operation of its built-in shift register circuit on the basis of a start signal SPY, which is supplied from the external control circuit via the terminals 102 (terminals TSPY) and the lines 105 (terminals TSPY). On the basis of a clock signal CLY and an inverse phase clock signal CLYINV, which are supplied via the terminals 102 (terminals TCLY and TCLYINV) and the line 105 (lines LCLY and LCLYINV), the scanning line driving circuit 104 applies a scanning signal to the scanning lines 3a at predetermined timing in a pulsed line-sequential manner.

The lines 105 (the common voltage lines LVcom) are formed on the element substrate 10 in such a way as to pass through the four substrate-to-substrate conductive electrodes 19. The common voltage Vcom is supplied to the substrate-to-substrate conductive electrodes 19 via the terminals 102 (terminals TVcom) and the lines 105 (common voltage lines LVcom).

(Structure of Color Filter Substrate 20)

Figure 3:
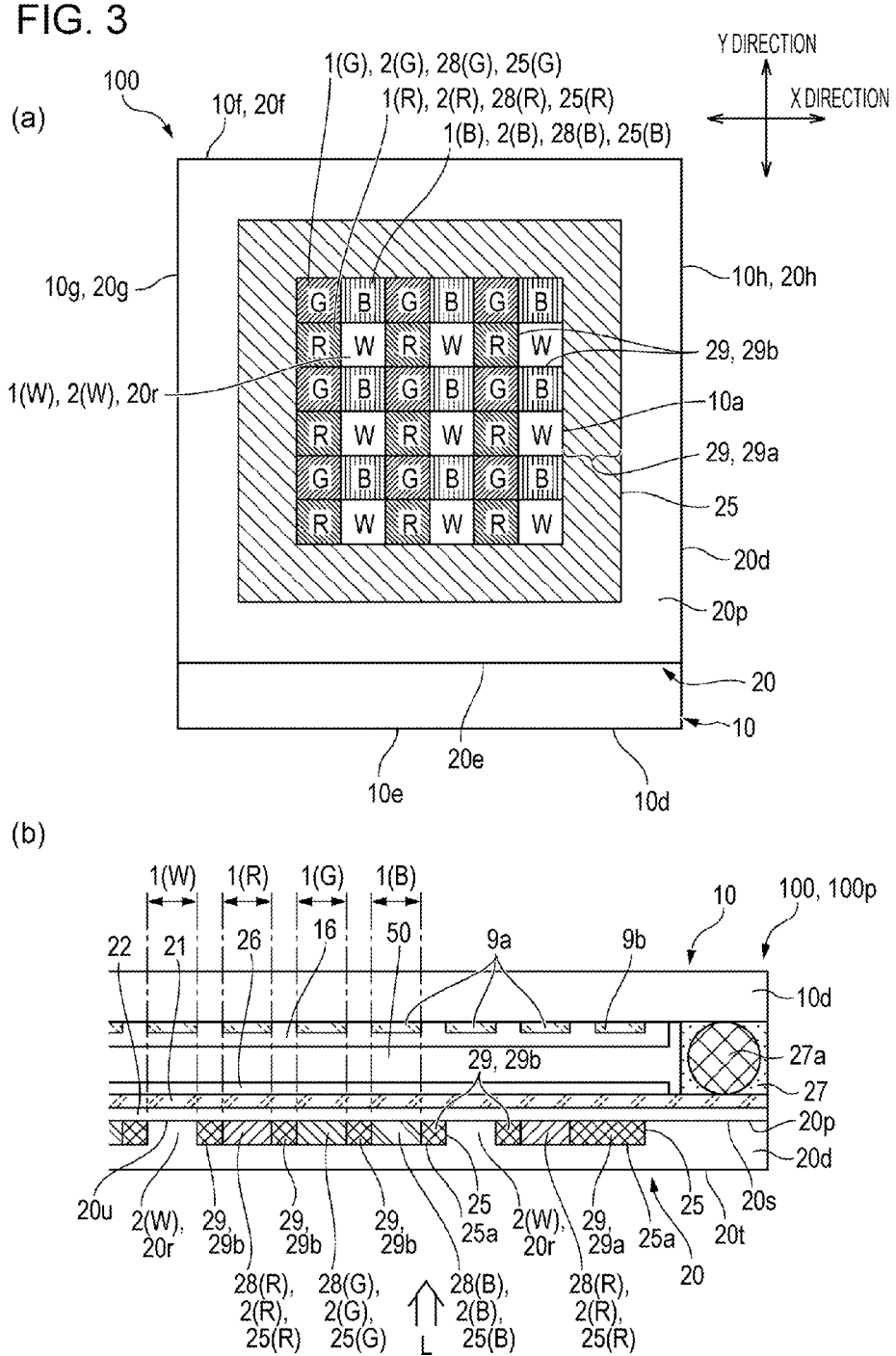
FIG. 3 is an explanatory diagram that schematically illustrates a color filter substrate, etc. used in the electro-optical device according to the first embodiment of the present invention.

FIG. 3 is an explanatory diagram that schematically illustrates the color filter substrate 20, etc. used in the electro-optical device 100 according to the first embodiment of the present invention, wherein FIG. 3(a) is an explanatory diagram that schematically illustrates the plan-view structure of the color filter substrate 20, and FIG. 3(b) is an explanatory diagram that schematically illustrates the cross-section structure of the color filter substrate 20. In FIG. 3(a), the number of the pixels 1 illustrated in FIG. 3(a) is smaller than actual number. In FIG. 3(b), the pixels 1 corresponding to the colors are illustrated in a state of being arranged in a line.

As illustrated in FIG. 3, in the electro-optical device 100 of this embodiment, each of the pixels 1 corresponds to red (R), green (G), or blue (B). The color correspondence is determined by the colored layer 28 formed in the color filter substrate 20. That is, the color filter substrate 20 has three types of colored pixels, which are: red pixels 2(R) provided with a colored layer 28(R) made of a red (R) resin layer, green pixels 2(G) provided with a colored layer 28(G) made of a green (G) resin layer, and blue pixels 2(B) provided with a colored layer 28(B) made of a blue (B) resin layer.

In addition, in this embodiment, some of the pixels 1 correspond to white (W). Therefore, there are non-colored pixels 2(W) in the color filter substrate 20. In this embodiment, as will be described later, no layer 28 made of colorless resin or white-pigment-containing resin is formed at the non-colored pixels 2(W).

In the electro-optical device 100, the pixel 1 of blue (B) is arranged next to the pixel 1 of green (G) in the X direction, the pixel 1 of red (R) is arranged next to the pixel 1 of green (G) in the Y direction, and the pixel 1 of white (W) is arranged next to the pixel 1 of blue (B) in the Y direction. In other words, in the color filter substrate 20 of this embodiment, the blue pixel 2(B) is arranged next to the green pixel 2(G) in the X direction, the red pixel 2(R) is arranged next to the green pixel 2(G) in the Y direction, and the non-colored pixel 2(W) is arranged next to the blue pixel 2(B) in the Y direction. The pixel 1 of green (G), the pixel 1 of blue (B), the pixel 1 of red (R), and the pixel 1 of white (W) are used as sub pixels that are driven at the same timing. These four sub pixels make up one pixel.

(Detailed Structure of Non-Colored Pixel 2(W), Etc.)

In the color filter substrate 20 of this embodiment, to form the structure of the red pixel 2(R), the green pixel 2(G), and the blue pixel 2(B), a concave portion 25 is formed in one surface of the substrate 20d, and three types of the colored layer 28 (the colored layer 28(R) of red (R), the colored layer 28(G) of green (G), and the colored layer 28(B) of blue (B)) are formed inside the concave portion 25. On the other hand, regarding the structure of the non-colored pixel 2(W), no layer 28 made of colorless resin or white-pigment-containing resin is formed. At the non-colored pixel 2(W), a thicker portion of the substrate 20d than the red pixel 2(R), the green pixel 2(G), and the blue pixel 2(B) remains as a convex portion 20r without being removed.

In this embodiment, the concave portion 25 is formed in, as one surface of the substrate 20d, the first surface 20s of the substrate 20d facing toward the element substrate 10. The convex portion 20r protrudes from the bottom 25a of the concave portion 25 toward the element substrate 10. In this embodiment, the concave portion 25 is formed at an area located at a distance from the sides 20e, 20f, 20g, and 20h of the substrate 20d (color filter substrate 20). That is, the concave portion 25 is formed in a rectangular area including the image forming area 10 and the frame portion 29a, but is not formed at an area where the sealing material 27 is provided. Therefore, a rectangular frame area 20p (edge portion), which is on the same plane as the surface 20u of the convex portion 20r, is formed on the first surface 20s of the substrate 20d between the concave portion 25 and the sides 20e, 20f, 20g, and 20h. The sealing material 27 is provided at an area overlapping the frame area 20p. In this embodiment, the thickness of the substrate 20d at the area where the convex portion 20r is formed is equal to the thickness of the substrate 20d at the frame area 20p.

The concave portion 25 includes a concave portion 25(R), inside which the colored layer 28(R) of red (R) is provided, a concave portion 25(G), inside which the colored layer 28(G) of green (G) is provided, and a concave portion 25(B), inside which the colored layer 28(B) of blue (B) is provided. The concave portion 25(R), the concave portion 25(G), and the concave portion 25(B) located adjacent to each other are partitioned from each other.

In this embodiment, the concave portion 25 is partitioned into the concave portion 25(R), the concave portion 25(G), and the concave portion 25(B) by the light shielding portion 29b of the light shielding layer 29. More specifically, in the light shielding portion 29b, a portion located between the red pixel 2(R) and the green pixel 2(G) is formed as a partition wall between the concave portion 25(R) and the concave portion 25(G) inside the concave portion 25, a portion located between the green pixel 2(G) and the blue pixel 2(B) is formed as a partition wall between the concave portion 25(G) and the concave portion 25(R) inside the concave portion 25, and a portion located between the blue pixel 2(B) and the red pixel 2(R) is formed as a partition wall between the concave portion 25(B) and the concave portion 25(R) inside the concave portion 25. In addition, in the light shielding portion 29b, a portion located between the non-colored pixel 2(W) and the red pixel 2(R) and a portion located between the non-colored pixel 2(W) and the blue pixel 2(B) are formed in such a way as to cover the sides of the convex portion 20r. The concave portion 25(R), the concave portion 25(G), and the concave portion 25(B) may be separated from one another by a convex grid formed by leaving a part of the substrate 20d.

In this embodiment, the light shielding portion 29b of the light shielding layer 29 is formed inside the concave portion 25, and the frame portion 29a of the light shielding layer 29 is also formed inside the concave portion 25. Inside the concave portion 25, the frame portion 29a surrounds the area where the red pixels 2(R), the green pixels 2(G), the blue pixels 2(B), and the non-colored pixels 2(W) are arranged.

In the color filter substrate 20 having the structure described above, the concave portion 25(R), 25(G), and 25(B) are of equal depth. Therefore, the thickness of the substrate 20d is the same at the red pixel 2(R), the green pixel 2(G), and the blue pixel 2(B). The thickness of the substrate 20d at the non-colored pixel 2(W) is greater than the thickness of the substrate 20d at the red pixel 2(R), the green pixel 2(G), and the blue pixel 2(B).

Moreover, the colored layer 28(R), 28(G), and 28(B) are of equal thickness. In this embodiment, the thickness of the colored layer 28(R), 28(G), and 28(B) is equal to the depth of the concave portion 25(R), 25(G), and 25(B). At the first surface 20s of the substrate 20d, for this reason, the surface of the red pixels 2(R), the surface of the green pixels 2(G), the surface of the blue pixels 2(B), and the surface of the non-colored pixels 2(W) are located at substantially the same height position from the substrate 20d. The overcoat film 22 made of a silicon oxide film, etc., the common electrode 21, and the alignment film 26 are formed sequentially in layers in such a way as to cover the red pixels 2(R), the green pixels 2(G), the blue pixels 2(B), and the non-colored pixels 2(W). In this embodiment, after the forming of the overcoat film 22 throughout the entire first surface 20s of the substrate 20d, the common electrode 21 is formed thereon throughout the entire first surface 20s of the substrate 20d, and the alignment film 26 is formed next thereon almost throughout the entire first surface 20s of the substrate 20d, except for the area where the sealing material 27 is formed. The alignment film 26 may be formed also at the area where the sealing material 27 is formed. Since the surface of the red pixels 2(R), the surface of the green pixels 2(G), the surface of the blue pixels 2(B), and the surface of the non-colored pixels 2(W) are located at substantially the same height position from the substrate 20d at the first surface 20s of the substrate 20d, the overcoat film 22, the common electrode 21, and the alignment film 26 are formed on a flat plane.

(Explanation of First Colored Pixel and Second Colored Pixel, Etc.)

In the color filter substrate 20 having the structure described above, one of the three types of the colored pixels (the red pixels 2(R), the green pixels 2(G), and the blue pixels 2(B)) corresponds to a "first colored pixel" according to the present invention, and another one of the three types of the colored pixels corresponds to a "second colored pixel" according to the present invention. Therefore, the remaining one corresponds to a "third colored pixel" according to the present invention. Accordingly, one of the three types of the colored layer 28 (the colored layer 28(R) of red (R), the colored layer 28(G) of green (G), and the colored layer 28(B) of blue (B)) corresponds to a "first colored layer" according to the present invention, and another one of the three types of the colored layer 28 corresponds to a "second colored layer" according to the present invention. Therefore, the remaining one corresponds to a "third colored layer" according to the present invention.

For example, the red pixel 2(R) is the "first colored pixel" according to the present invention, the green pixel 2(G) is the "second colored pixel" according to the present invention, and the blue pixel 2(B) is the "third colored pixel" according to the present invention. Accordingly, the colored layer 28(R) of red (R) is the "first colored layer" according to the present invention, the colored layer 28(G) of green (G) is the "second colored layer" according to the present invention, and the colored layer 28(B) of blue (B) is the "third colored layer" according to the present invention. The concave portion 25(R) is a "first concave portion" according to the present invention, the concave portion 25(G) is a "second concave portion" according to the present invention, and the concave portion 25(B) is a "third concave portion" according to the present invention. The correspondence between "first", "second", and "third" mentioned above and the colors may be any combination other than the above combination.

(Method of Manufacturing Color Filter Substrate 20)

Figure 4:
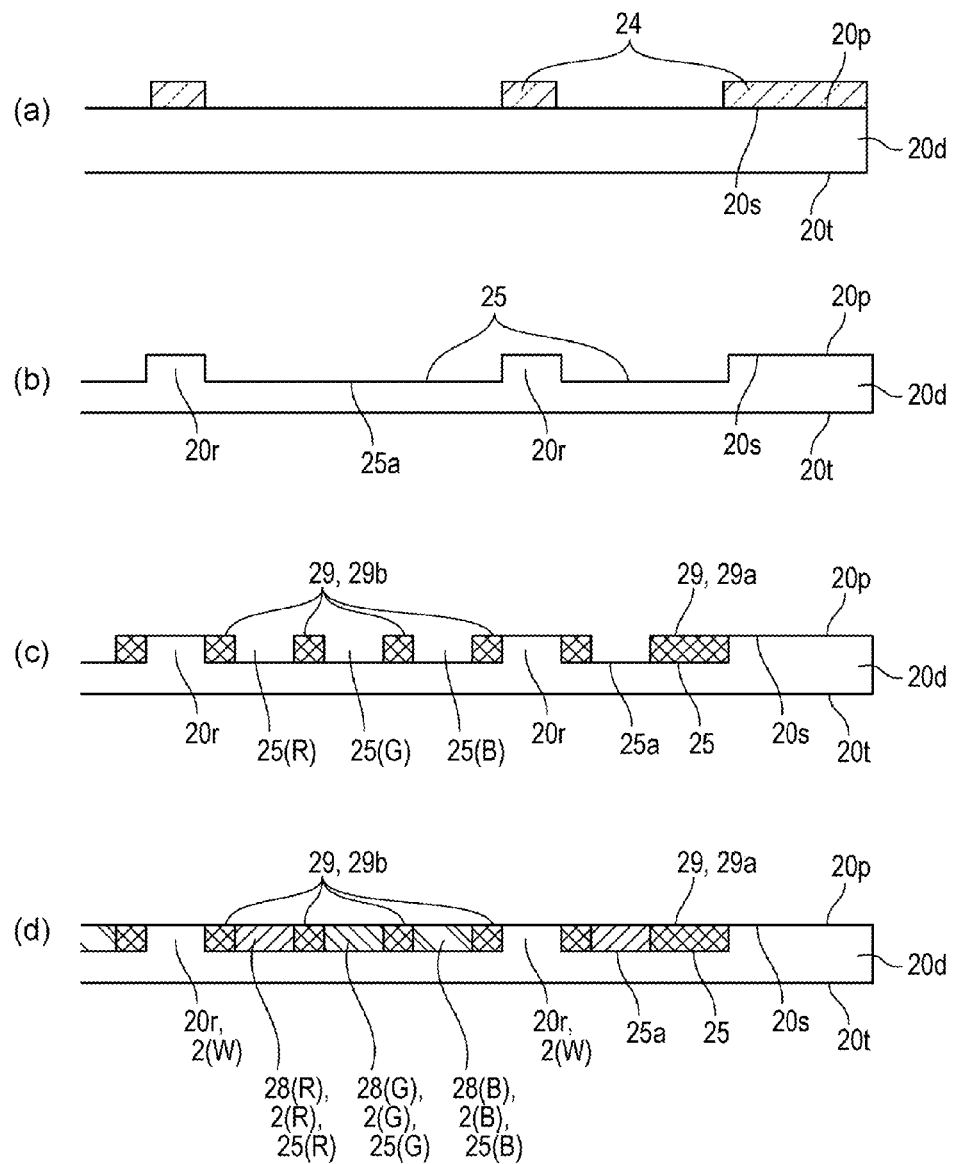
FIG. 4 is a process sectional view that illustrates the method of manufacturing the color filter substrate according to the first embodiment of the present invention.
Figure 5:
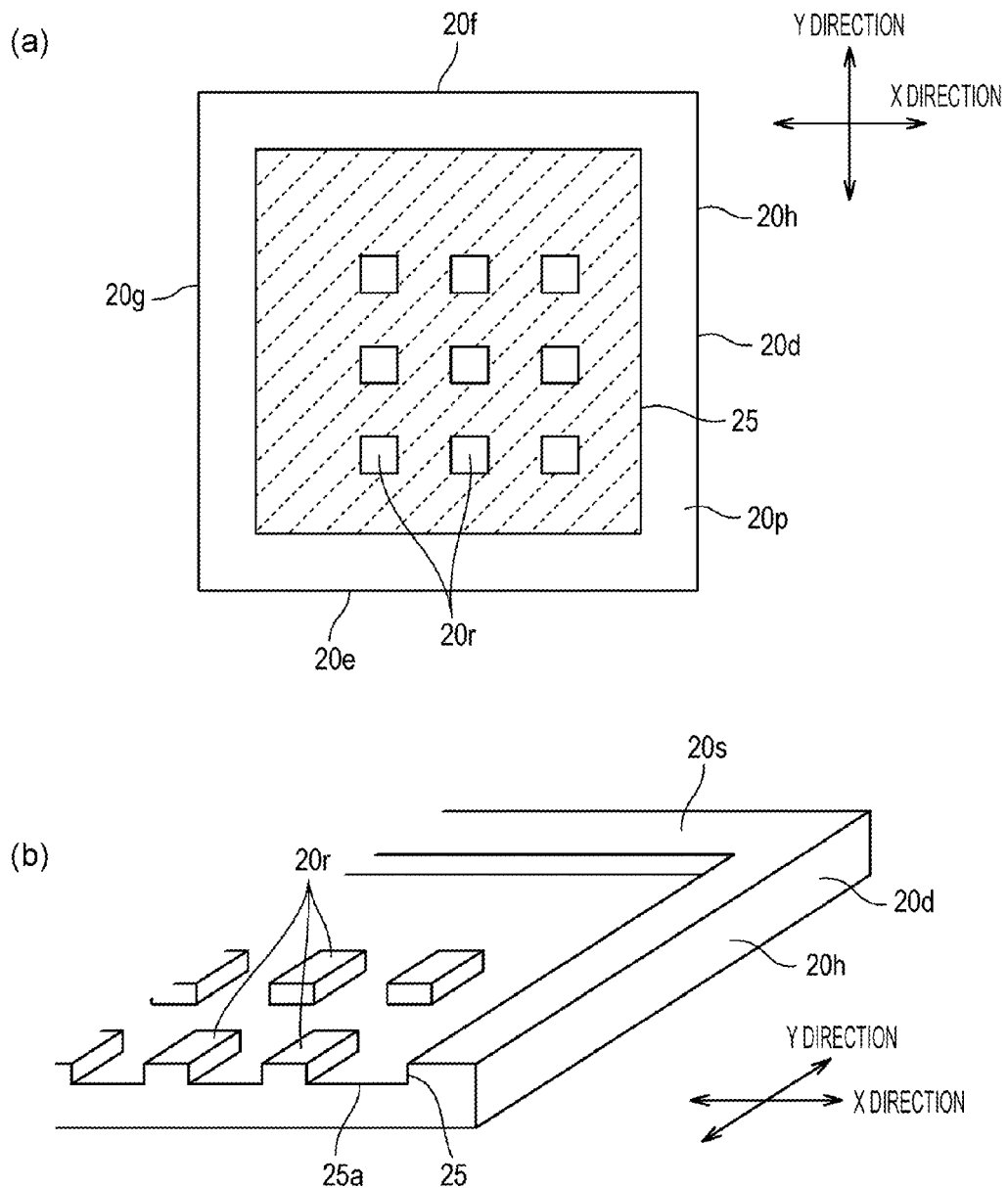
FIG. 5 is a diagram for explaining an etching forming process among the processes of manufacturing the color filter substrate according to the first embodiment of the present invention.
Figure 6:
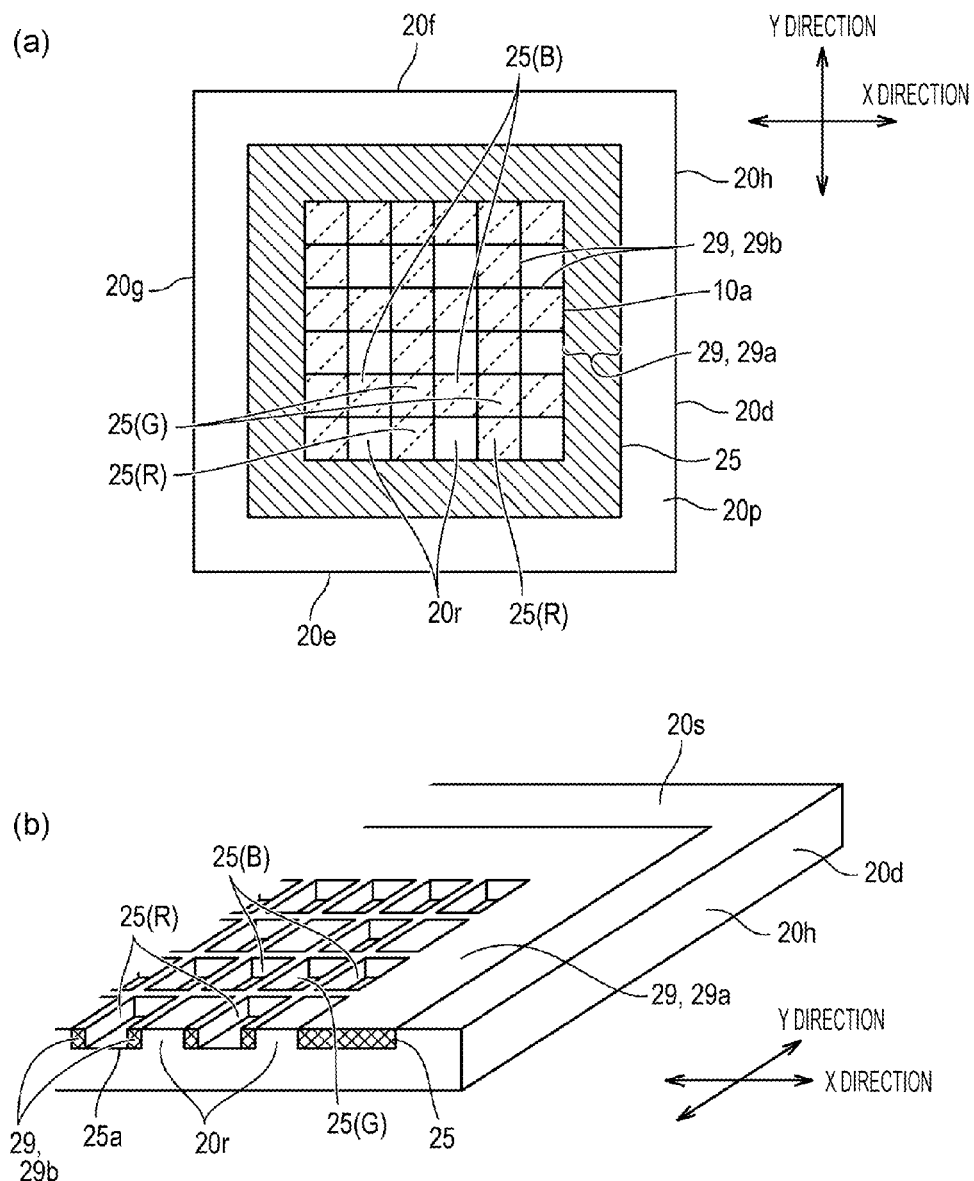
FIG. 6 is a diagram for explaining a light shielding layer forming process among the processes of manufacturing the color filter substrate according to the first embodiment of the present invention.
Figure 7:
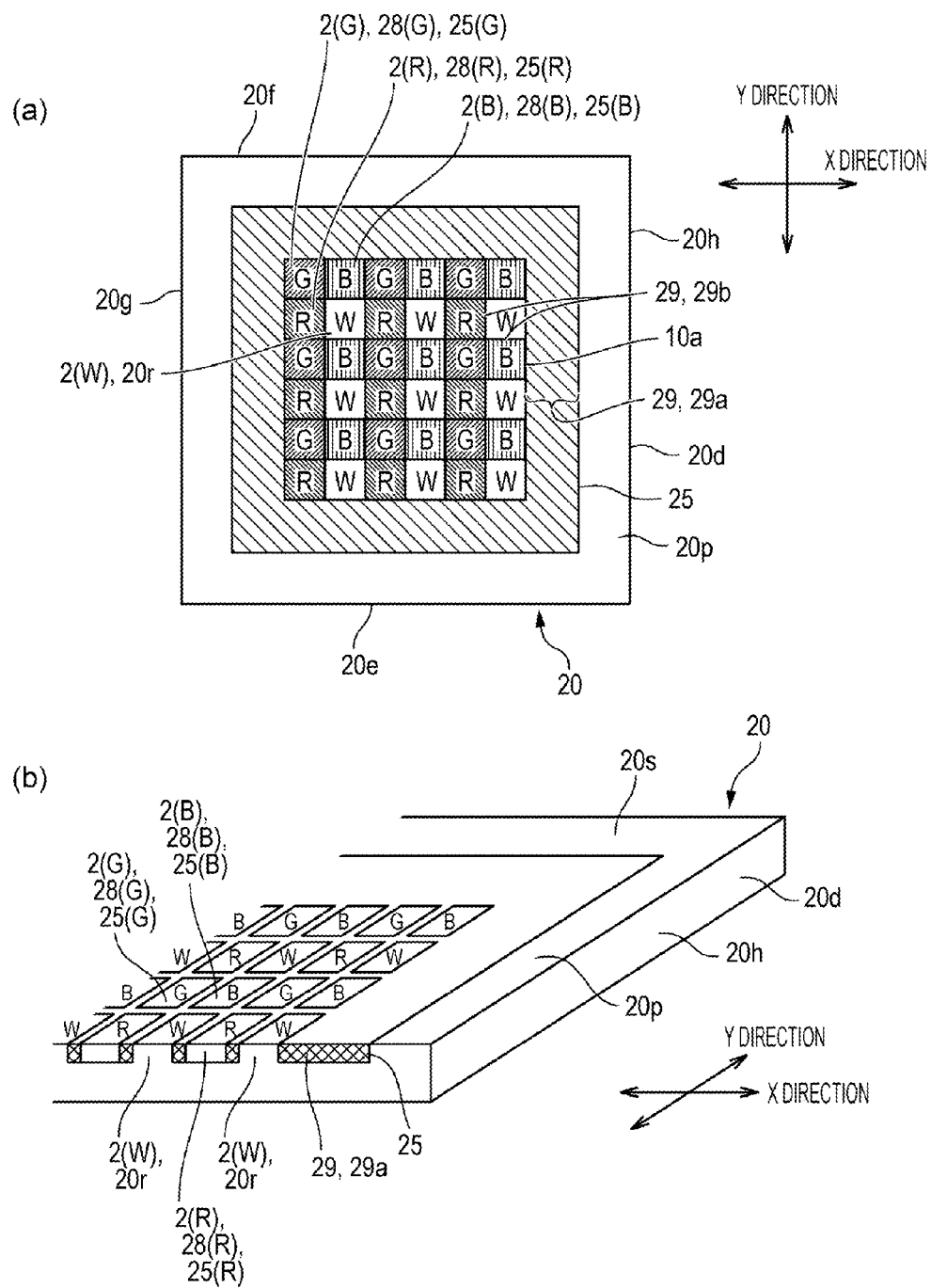
FIG. 7 is a diagram for explaining a colored layer forming process among the processes of manufacturing the color filter substrate according to the first embodiment of the present invention.

FIG. 4 is a process sectional view that illustrates the method of manufacturing the color filter substrate 20 according to the first embodiment of the present invention. FIG. 5 is a diagram for explaining an etching forming process among the processes of manufacturing the color filter substrate 20 according to the first embodiment of the present invention, wherein FIG. 5(a) is an explanatory diagram that illustrates the plan-view structure thereof, and FIG. 5(b) is an explanatory diagram that illustrates the sectional structure, etc. thereof. FIG. 6 is a diagram for explaining a light shielding layer forming process among the processes of manufacturing the color filter substrate 20 according to the first embodiment of the present invention, wherein FIG. 6(a) is an explanatory diagram that illustrates the plan-view structure thereof, and FIG. 6(b) is an explanatory diagram that illustrates the sectional structure, etc. thereof. FIG. 7 is a diagram for explaining a colored layer forming process among the processes of manufacturing the color filter substrate 20 according to the first embodiment of the present invention, wherein FIG. 7(a) is an explanatory diagram that illustrates the plan-view structure thereof, and FIG. 7(b) is an explanatory diagram that illustrates the sectional structure, etc. thereof.

To manufacture the color filter substrate 20 of this embodiment, first, in an etching mask forming process illustrated in FIG. 4(a), an etching mask 24 is formed on the first surface 20s of the light-transmissive substrate 20d, with a part of the first surface 20s exposed. More specifically, the area where each non-colored pixel 2(W) is to be formed and the frame area 20p on the first surface 20s of the substrate 20d are covered by the etching mask 24, whereas the area where the concave portion 25 is to be formed is exposed. A resist mask or a hard mask can be used as the etching mask 24.

Next, in an etching process illustrated in FIG. 4(b), the portion exposed through the etching mask 24 formed on the first surface 20s of the substrate 20d is etched away to form the concave portion 25, and the etching mask 24 is removed after the etching. As a result, as illustrated in FIG. 5, in the first surface 20s of the substrate 20d, the area where each non-colored pixel 2(W) is to be formed remains as the convex portion 20r without being etched away, and the frame area 20p, by which the concave portion 25 is surrounded, also remains without being etched away. If dry etching is employed in the etching process described above, a hydrofluoric acid chemical solution is used as the etchant. For example, etching liquid such as fluorinated acid, fluorinated sulfonic acid, hydrofluosilicic acid, ammonium fluoride, hydrofluoric acid, or the like can be suitably used. More specifically, a mixed solution of hydrofluoric acid and nitric acid, a mixed solution of hydrofluoric acid and ammonium fluoride, a mixed solution of hydrofluoric acid, ammonium fluoride, and nitric acid, a solution of hydrofluoric acid and ammonium hydrogen bifluoride, a solution of hydrofluoric acid, ammonium hydrogen bifluoride, and nitric acid can be used. A strong alkali chemical solution such as caustic soda (NaOH), potassium hydroxide (KOH), or the like may be used, though there is a disadvantage of a low etching speed. A dry etching method, etc. using etching gas may be used as the etching method.

Next, in a light shielding layer forming process illustrated in FIG. 4(c), after the forming of a metal film such as an aluminum film in the first surface 20s of the substrate 20d, the metal film is patterned to form the light shielding layer 29 inside the concave portion 25. As a result, as illustrated in FIG. 6, the frame portion 29a is formed inside the concave portion 25, and, in addition, the light shielding portion 29b is formed inside the concave portion 25. The concave portion 25(R), 25(G), and 25(B) are partitioned inside the concave portion 25 by the light shielding portion 29b.

Next, in a color forming process illustrated in FIG. 4(d), as illustrated in FIG. 7, the colored layer 28(R) is formed inside the concave portion 25(R), the colored layer 28(G) is formed inside the concave portion 25(G), and the colored layer 28(B) is formed inside the concave portion 25(B). As a result, the red pixel 2(R), the green pixel 2(G), and the blue pixel 2(B) are formed. The non-colored pixel 2(W), which does not have any colored layer, is formed at the position where the convex portion 20r is located. In the color forming process, for example, resin materials corresponding to predetermined colors are ejected from an ink-jet printer ejection apparatus into the concave portion 25(R), 25(G), and 25(B), and, after the ejection, the resin materials are left to cure. After the forming of the resin layer of the predetermined colors, the process of patterning the resin layer by using a photolithography technique is repeated to sequentially form the colored layer 28(R), 28(G), and 28(B) made of the resin layer of red (R), green (G), and blue (B).

After that, as illustrated in FIGS. 1(b) and 3(b), the overcoat film 22 made of a silicon oxide film, etc., the common electrode 21, and the alignment film 26 are formed sequentially. As a result, the color filter substrate 20 is manufactured.

(Main Effects of the Present Embodiment)

As explained above, in the color filter substrate 20 and the electro-optical device 100 according to the present embodiment, the non-colored pixel 2(W) is provided in addition to the red pixel 2(R), which is the first colored pixel, the green pixel 2(G), which is the second colored pixel, and the blue pixel 2(B), which is the third colored pixel. Therefore, advantageously, it is possible to increase the amount of light for white display.

Moreover, since the colored layer 28(R), 28(G), 28(B) is formed inside the concave portion 25 of the substrate 20d, there is no significant protrusion of the colored layer 28(R), 28(G), 28(B) from the first surface 20s of the substrate 20d. Regarding the structure of the non-colored pixel 2(W), no layer made of colorless resin or white-pigment-containing resin is formed, and a thick non-removed portion (convex portion 20r) of the substrate 20d is utilized. Therefore, the process of forming a colorless resin layer or forming a white-pigment-containing resin layer at the non-colored pixel 2(W) is not necessary. Therefore, it is possible to form the colored pixels (the red pixel 2(R), the green pixel 2(G), and the blue pixel 2(B)) and the non-colored pixel 2(W) efficiently.

Furthermore, since the substrate 20d remains thick as the convex portion 20r at the non-colored pixel 2(W) instead of forming a layer made of colorless resin or white-pigment-containing resin thereat, the non-colored pixel 2(W) is not significantly recessed at the first surface 20s of the substrate 20d in comparison with the colored layer 28(R), 28(G), and 28(B). Therefore, advantageously, it is possible to stabilize a cell gap (the thickness of the liquid crystal layer 50) when the color filter substrate 20 is used as an opposite substrate provided opposite the element substrate 10 in a liquid crystal device.

Moreover, since the colored layer 28(R), 28(G), 28(B) is formed at the concave portion 25(R), 25(G), 25(B), which are compartments of the concave portion 25, it is possible to provide the colored layer 28(R), 28(G), 28(B) inside areas compartmentalized by the concave portion 25(R), 25(G), 25(B). The colored layer 28(R), 28(G), 28(B) is provided inside the concave portion 25 at the concave portion 25(R), 25(G), 25(B) partitioned by the light shielding portion 29b. Therefore, when viewed in a direction of a normal line to the substrate 20d, each of the colored pixels (the red pixel 2(R), the green pixel 2(G), and the blue pixel 2(B)) and the non-colored pixel 2(W) is enclosed by the light shielding portion 29b. This prevents color mixture between the pixels 1 located adjacent to each other.

At the colored pixels (the red pixel 2(R), the green pixel 2(G), and the blue pixel 2(B)), the depth of the concave portion 25 is the same, the thickness of the substrate 20d is the same, and, in addition, the thickness of the colored layer 28(R), 28(G), and 28(B) is the same. For this reason, the surface of the colored pixels (the red pixel 2(R), the green pixel 2(G), and the blue pixel 2(B)) that is the opposite of the surface on the substrate 20d are located at substantially the same height position from the substrate 20d. Therefore, advantageously, it is possible to stabilize a cell gap (the thickness of the liquid crystal layer 50). In this embodiment, the thickness of the colored layer 28(R), 28(G), and 28(B) is substantially equal to the depth of the concave portion 25(R), 25(G), and 25(B). For this reason, the surface of the colored pixels (the red pixel 2(R), the green pixel 2(G), and the blue pixel 2(B)) that is the opposite of the surface on the substrate 20d, and the surface of the non-colored pixel 2(W), are located at substantially the same height position from the substrate 20d. Therefore, advantageously, it is possible to stabilize a cell gap (the thickness of the liquid crystal layer 50).

Second Embodiment

Figure 8:
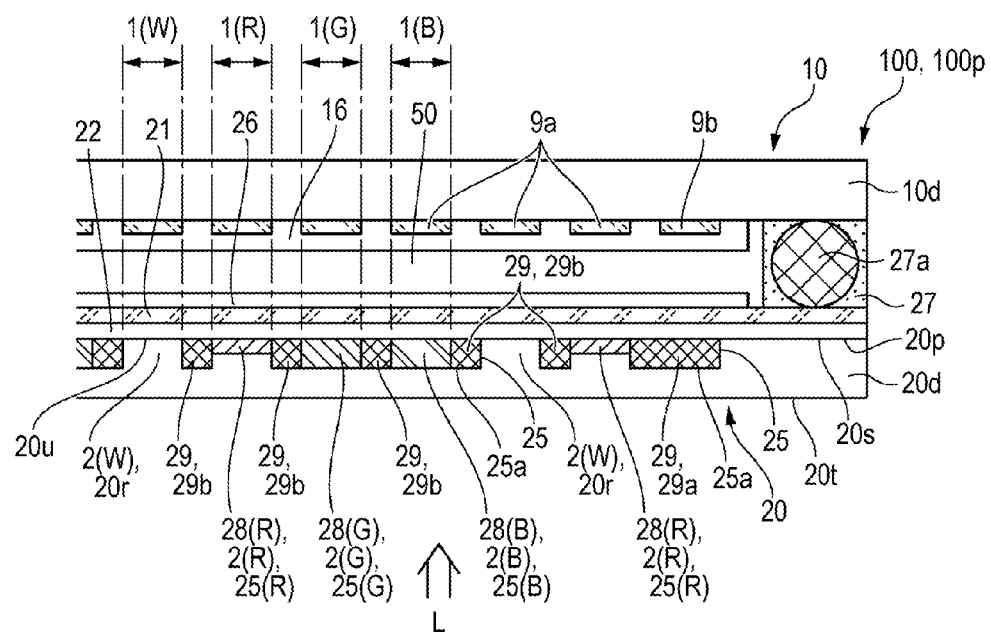
FIG. 8 is a sectional view that illustrates a color filter substrate, etc. according to a second embodiment of the present invention.

FIG. 8 is a sectional view that illustrates the color filter substrate 20, etc. according to a second embodiment of the present invention. Since the basic structure of the present embodiment is the same as that of the first embodiment, the same reference numerals are assigned to the same portions, and no explanation of them is given here.

As illustrated in FIG. 8, in this embodiment, the depth of the concave portion 25 at the red pixel 2(R) is less than that at the green pixel 2(G) and the blue pixel 2(B), and the thickness of the substrate 20d at the red pixel 2(R) is greater than that at the green pixel 2(G) and the blue pixel 2(B). Such a structure can be formed by, for example, performing each of the etching mask forming process and the etching process twice. Alternatively, such a structure can be formed by making the thickness of the etching mask 24 at the red pixel 2(R) greater than that at the green pixel 2(G) and the blue pixel 2(B) by using half exposure, etc. in the etching mask forming process. In this case, a method of resuming etching after removing the etching mask 24 from the surface during the etching process or a method of performing the etching of the first surface 20s of the substrate 20d and the etching of the etching mask 24 concurrently in the etching process is used.

In this embodiment, the thickness of the colored layer 28(R) is less than that of the colored layer 28(G), 28(B). For this reason, the surface of the colored pixels (the red pixel 2(R), the green pixel 2(G), and the blue pixel 2(B)) that is the opposite of the surface on the substrate 20d are located at substantially the same height position from the substrate 20d. In addition, the surface of the colored pixels (the red pixel 2(R), the green pixel 2(G), and the blue pixel 2(B)) that is the opposite of the surface on the substrate 20d, and the surface of the non-colored pixel 2(W), are located at substantially the same height position from the substrate 20d.

For this reason, though the thickness of the colored layer 28(R) is less than that of the colored layer 28(G), 28(B), advantageously, it is possible to stabilize a cell gap (the thickness of the liquid crystal layer 50), and, in addition, it is possible to adjust the chromaticity of the colored layer 28(R).

Third Embodiment

Figure 9:
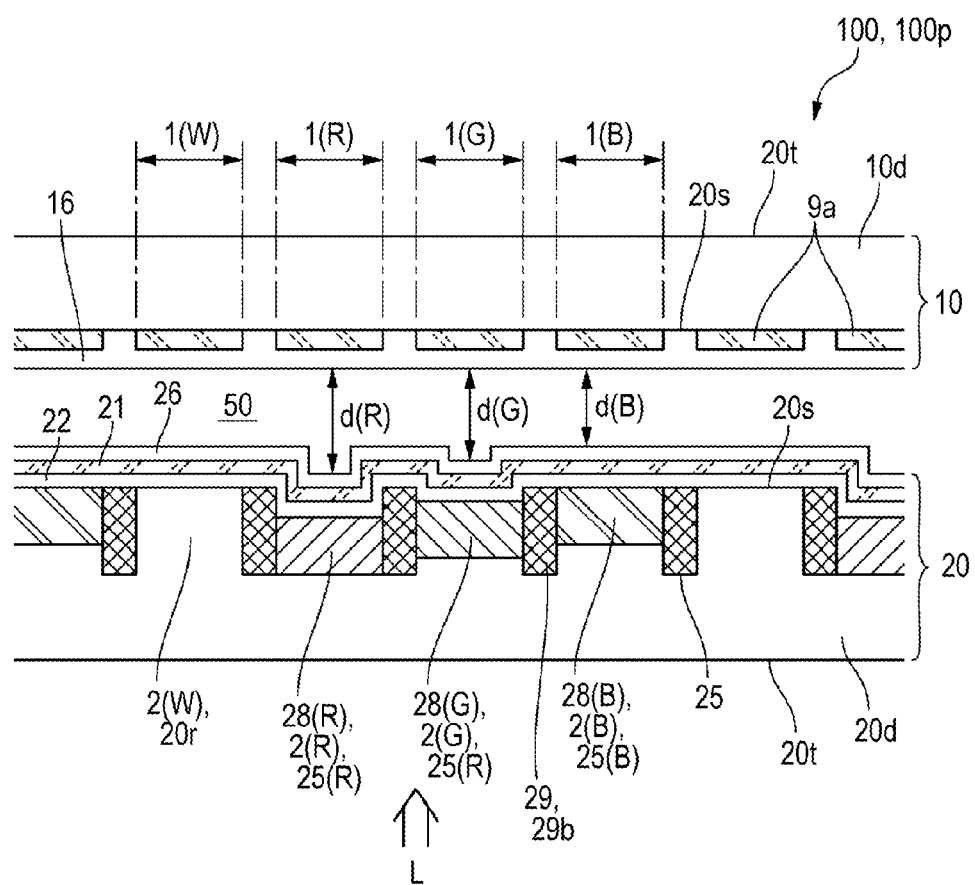
FIG. 9 is a sectional view that illustrates a color filter substrate, etc. according to a third embodiment of the present invention.

FIG. 9 is a sectional view that illustrates the color filter substrate 20, etc. according to a third embodiment of the present invention. Since the basic structure of the present embodiment is the same as that of the first embodiment, the same reference numerals are assigned to the same portions, and no explanation of them is given here.

As illustrated in FIG. 8, in this embodiment, regarding the depth of the concave portion 25 and the thickness of the substrate 20d, there is the following relationship among the red pixel 2(R), the green pixel 2(G), and the blue pixel 2(B).

Depth of Concave Portion 25

Red Pixel 2(R)>Green Pixel 2(G)>Blue Pixel 2(B)

Thickness of Substrate 20d

Red Pixel 2(R)<Green Pixel 2(G)<Blue Pixel 2(B)

Such a structure can be formed by, for example, performing each of the etching mask forming process and the etching process three times. Alternatively, the thickness of the etching mask 24 at the red pixel 2(R), the green pixel 2(G), and the blue pixel 2(B) may be made different from one another by using half exposure, etc. in the etching mask forming process, and the thickness difference may be utilized for making the depth of the concave portion 25 thereat different from one another.

In this embodiment, the colored layer 28(R), 28(G), and 28(B) are of equal thickness. Therefore, there is the following relationship regarding the height position, from the substrate 20d, of the surface of the colored layer 28(R), 28(G), and 28(B) that is the opposite of the surface on the substrate 20d, and regarding the cell gap (the thickness of the liquid crystal layer 50).

Height Position

Red Pixel 2(R)<Green Pixel 2(G)<Blue Pixel 2(B)

Cell Gap (Thickness of Liquid Crystal Layer 50)

Red Pixel 2(R)<Green Pixel 2(G)<Blue Pixel 2(B)

Therefore, it is possible to adapt retardation at the red pixel 2(R), the green pixel 2(G), and the blue pixel 2(B) to the wavelength of light passing through the red pixel 2(R), the green pixel 2(G), and the blue pixel 2(B).

Fourth Embodiment

FIG. 10 is a sectional view that illustrates the color filter substrate 20, etc. according to a fourth embodiment of the present invention, wherein FIG. 10(a) is a diagram for explaining an example of a structure in which the index of refraction of the colored layer 28 is greater than that of the substrate 10d, and FIG. 10(b) is a diagram for explaining an example of a structure in which the index of refraction of the colored layer 28 is less than that of the substrate 10d. Since the basic structure of the present embodiment is the same as that of the first embodiment, the same reference numerals are assigned to the same portions, and no explanation of them is given here.

As illustrated in FIG. 10, in this embodiment, the index of refraction of the colored layer 28(R), 28(G), and 28(B) is different from that of the substrate 10d, and the bottom 25a of the concave portion 25(R), 25(G), and 25(B) is curved so as to constitute a micro lens surface. More specifically, in the structure example illustrated in FIG. 10(a), the index of refraction of the colored layer 28(R), 28(G), and 28(B) is greater than that of the substrate 10d, and the bottom 25a of the concave portion 25(R), 25(G), and 25(B) is curved in a concave shape so as to constitute a micro lens surface. On the other hand, in the structure example illustrated in FIG. 10(b), the index of refraction of the colored layer 28(R), 28(G), and 28(B) is less than that of the substrate 10d, and the bottom 25a of the concave portion 25(R), 25(G), and 25(B) is curved in a convex shape so as to constitute a micro lens surface.

When white light coming from a light source as indicated by an arrow L passes through the colored layer 28(R) at the red pixel 2(R), the colored layer 28(G) at the green pixel 2(G), and the colored layer 28(B) at the blue pixel 2(B), the light is directed toward the pixel electrodes 9a by the lens surface efficiently. Therefore, the structure described above increases the amount of display light and prevents color mixture. The light shielding layer 29 is formed outside the concave portion 25.

Fifth Embodiment

Figure 11:
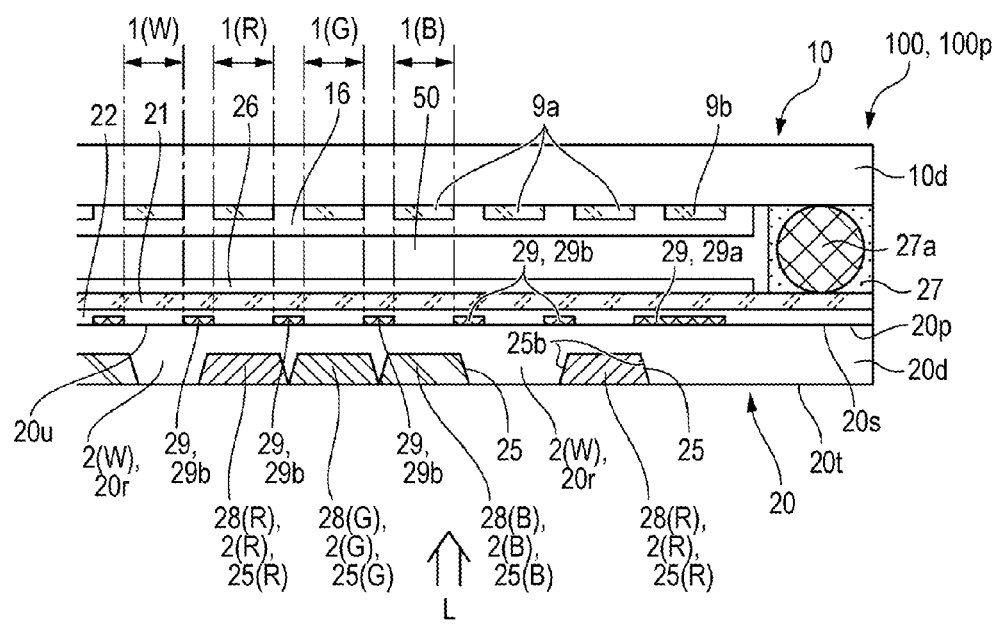
FIG. 11 is a sectional view that illustrates a color filter substrate, etc. according to a fifth embodiment of the present invention.

FIG. 11 is a sectional view that illustrates the color filter substrate 20, etc. according to a fifth embodiment of the present invention. Since the basic structure of the present embodiment is the same as that of the first embodiment, the same reference numerals are assigned to the same portions, and no explanation of them is given here.

As illustrated in FIG. 11, in this embodiment, the concave portion 25(R), 25(G), and 25(B) are formed in the second surface 20t of the substrate 20d (one surface in this embodiment). The sides 25b of the concave portion 25(R), 25(G), and 25(B) are formed in the second surface 20t. The concave portion 25(R), 25(G), 25(B) has reflective surfaces inclined in such a way that the opening area size increases toward the second surface 20t. Such a reflective surface structure can be formed by forming a reflective film such as aluminum film on the sides 25b or by utilizing total reflection caused by the difference between the index of refraction of the colored layer 28(R), 28(G), and 28(B) and the index of refraction of the substrate 20d.

When white light coming from a light source as indicated by an arrow L passes therethrough at the red pixel 2(R), the green pixel 2(G), and the blue pixel 2(B), the light is directed toward the pixel electrodes 9a by the sides 25b efficiently. Therefore, this embodiment also increases the amount of display light and prevents color mixture. The light shielding layer 29 is formed outside the concave portion 25.

Other Embodiments

In the foregoing embodiments, since the light-transmissive substrate 20d in its entirety is made of a glass substrate or a quartz substrate, etc., the concave portion 25 is formed in the glass substrate or the quartz substrate. If a light-transmissive insulation film is formed on one surface of the light-transmissive substrate 20d made of a glass substrate or a quartz substrate, etc., the concave portion 25 may be formed in the light-transmissive insulation film.

In the foregoing embodiments, colored pixels corresponding to three colors are provided. As long as the first colored pixel and the second colored pixel are provided, the invention may be applied to the color filter substrate 20 in which colored pixels corresponding to two colors, or four colors or more, are provided.

In the foregoing embodiments, the surface 20u of the convex portion 20r of the non-colored pixel 2(W) and the bottom 25a of the concave portion 25 are not irregular. However, light-scattering property may be added by forming an ultra-small convex-and-concave pattern in the surface 20u of the convex portion 20r or the bottom 25a of the concave portion 25 by frosting or the like.

[Other Electro-Optical Devices]

In the foregoing embodiments, a liquid crystal device is taken as an example of an electro-optical device. However, the present invention is not limited thereto. The present invention may be applied to the color filter substrate 20 of an electro-optical device using a DMD (digital micro-mirror device), an organic electroluminescence display device, a plasma display, an FED (Field Emission Display), and SED (Surface-Conduction Electron-Emitter Display), an electrophoresis display device, or the like.

[Example of Mounting on Electronic Equipment]

(Example of Structure of Projection-Type Display Device)

Figure 12:
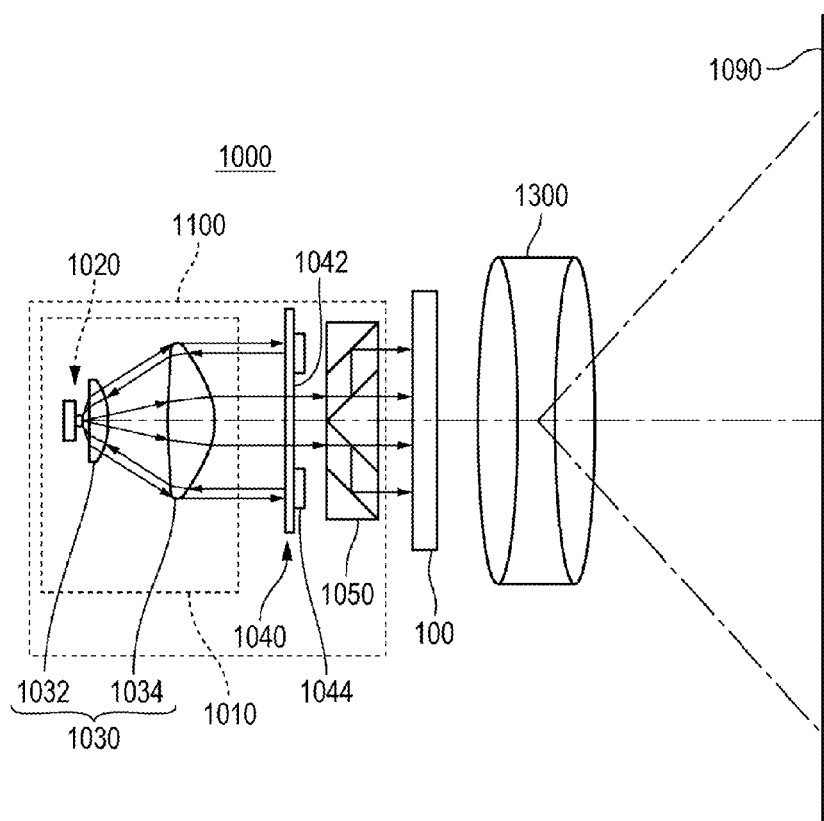
FIG. 12 is a diagram for explaining a projection-type display device (electro-optical device) to which the present invention is applied.

FIG. 12 is a diagram for explaining a projection-type display device (electro-optical device) to which the present invention is applied. In FIG. 12, a projection-type display device 1000 of this example includes an illumination device 1100, the electro-optical device 100, and a projection optical system 1300. In this example, the projection-type display device 1000 is a single-type projector equipped with one electro-optical device 100.

The illumination device 1100 includes a light source device 1010, a reflection means 1040, and a polarization conversion element 1050. The illumination device 1100 emits, as illumination light, light (white light) that contains red light, green light, and blue light. More specifically, the illumination device 1100 is a light source device that emits parallel rays, and includes a white emission diode 1020 and a collimator optical system 1030. The white emission diode 1020 is, for example, a lambert-emission-type light emission diode that has a fluorescent layer, and emits light hat contains red light, green light, and blue light.

The collimator optical system 1030 is an optical element that makes light coming from the white emission diode 1020 parallel, and is made up of two collimator lenses (a first lens 1032 and a second lens 1034). The reflection means 1040 is provided between the light source device 1010 and the polarization conversion element 1050. The reflection means 1040 allows light in the neighborhood of the optical axis of the light source device 1010 to pass through itself, and reflects light in the peripheral region, which is distant from the optical axis of the light source device 1010, toward the fluorescent layer of the white emission diode 1020. More specifically, the reflection means 1040 includes a transmissive portion 1042, transmissive portion 1042, and a reflective portion 1044. The polarization conversion element 1050 is an element that performs polarization conversion on light having passed through the transmissive portion 1042 of the reflection means 1040.

In the projection-type display device 1000 having the structure described above, light-source light emitted from the light source device 1010 is modulated at the electro-optical device 100, and, after the modulation, the magnified projection of a color image onto a projection target member 1090 such as a screen is performed by the projection optical system 1300.

(Other Electronic Equipment)

Besides the electronic equipment described above, the electro-optical device 100 to which the present invention is applied may be used as other electronic equipment such as a mobile phone, a portable information terminal (PDA: Personal Digital Assistants), a digital camera, a liquid crystal television, a car navigation device, a television telephone, a POS terminal, or touch-panel-equipped equipment, etc. as a direct-view-type display device.

REFERENCE SIGNS LIST 1 pixel
2(B) blue pixel (third colored pixel)
2(G) green pixel (second colored pixel)
2(R) red pixel (first colored pixel)
2(W) non-colored pixel
9a pixel electrode
10 element substrate
20 color filter substrate
20d light-transmissive substrate
20s first surface
20t second surface
21 common electrode 21
22 overcoat film
24 etching mask
25 concave portion
25(B) concave portion (third concave portion)
25(G) concave portion (second concave portion)
25(R) concave portion (first concave portion)
25a bottom
25b side
26 alignment film
27 sealing material
28 colored layer
28(B) colored layer (third colored layer)
28(G) colored layer (second colored layer)
28(R) colored layer (first colored layer)
29 light shielding layer
29a frame portion 29a
29b light shielding portion (black matrix portion)
30 pixel transistor
100 electro-optical device
107 sealing material
50 liquid crystal layer
1000 projection-type display device
1010 light source device
1020 white emission diode
1300 projection optical system

The invention claimed is:

1. A color filter substrate, comprising:
a first colored pixel at which a first colored layer is provided inside a concave portion formed in one surface of a substrate;
a second colored pixel at which a second colored layer is provided inside the concave portion, color of the second colored layer being different from color of the first colored layer; and
a non-colored pixel at which no colored layer is provided, the non-colored pixel being located at a position where thickness of the substrate is greater than that at the first colored pixel and the second colored pixel.

2. The color filter substrate according to claim 1, wherein the concave portion includes a first concave portion inside which the first colored layer is provided and a second concave portion inside which the second colored layer is provided.

3. The color filter substrate according to claim 1, wherein each of the first colored pixel, the second colored pixel, and the non-colored pixel is enclosed by a light shielding layer when viewed in a direction of a normal line to the substrate.

4. The color filter substrate according to claim 1, wherein each of the first colored pixel, the second colored pixel, and the non-colored pixel is enclosed by a light shielding layer when viewed in a direction of a normal line to the substrate; and
wherein the concave portion includes, by the light shielding layer, a first concave portion inside which the first colored layer is provided and a second concave portion inside which the second colored layer is provided.

5. The color filter substrate according to claim 1, wherein the thickness of the substrate at the non-colored pixel is equal to the thickness of the substrate at an edge portion of the substrate; and
wherein a surface located at the non-colored pixel at the one surface of the substrate is on the same plane as a surface located at the edge portion at the one surface of the substrate.

6. The color filter substrate according to claim 1, wherein an index of refraction of the first colored layer and the second color layer is different from an index of refraction of the substrate; and
wherein bottom of the first concave portion and the second concave portion is curved in a convex or concave shape so as to constitute a micro lens surface.

7. The color filter substrate according to claim 2, wherein sides of the first concave portion and the second concave portion are reflective surfaces inclined in such a way that opening area size increases toward the one surface.

8. The color filter substrate according to claim 1, wherein the thickness of the substrate at the first colored pixel is equal to the thickness of the substrate at the second colored pixel.

9. The color filter substrate according to claim 1,
wherein the thickness of the substrate at the first colored pixel is different from the thickness of the substrate at the second colored pixel.

10. The color filter substrate according to claim 1,
wherein thickness of the first colored layer is equal to thickness of the second colored layer.

11. The color filter substrate according to claim 1,
wherein thickness of the first colored layer is different from thickness of the second colored layer.

12. The color filter substrate according to claim 1,
wherein a surface of the first colored layer that is the opposite of a surface on the substrate and a surface of the second colored layer that is the opposite of a surface on the substrate are located at the same height position from the substrate.

13. The color filter substrate according to claim 1,
wherein a surface of the first colored layer that is the opposite of a surface on the substrate and a surface of the second colored layer that is the opposite of a surface on the substrate are located at different height positions from the substrate.

14. An electro-optical device that comprises the color filter substrate according to claim 1 and outputs image light, said image light obtained either by modulating light of each of pixels, said light of each of pixels having passed through the first colored pixel, the second colored pixel, and the non-colored pixel, or by allowing light of each of the pixels, said light of each of the pixels having been modulated, to pass through the first colored pixel, the second colored pixel, and the non-colored pixel.

15. A projection-type display device, comprising:
the electro-optical device according to claim 14; and
a projection optical system that projects the image light.

* * * * *